Figure 1:
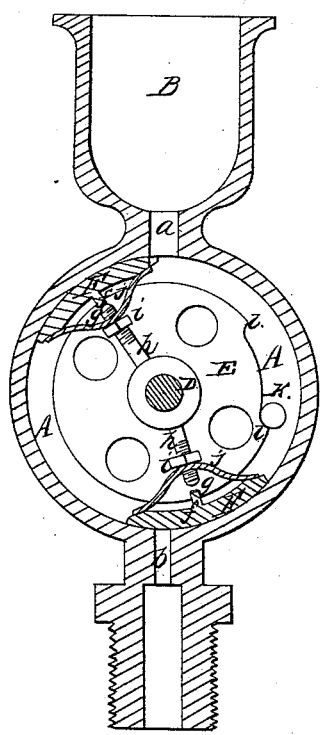
Figure 2:
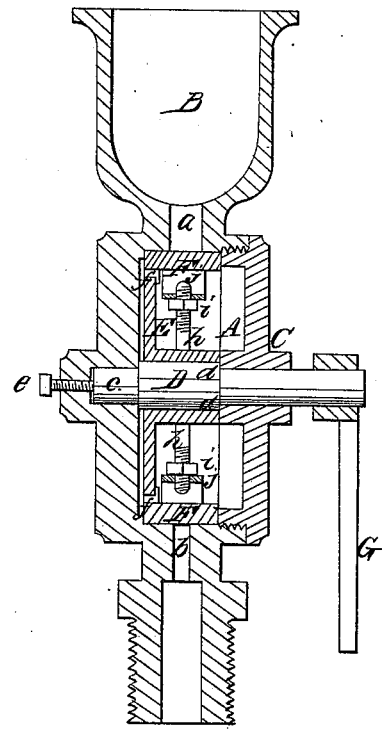

W. K. Stevens,
Lubricator.

Nº 19,385.    Patented Feb. 16, 1858.

UNITED STATES PATENT OFFICE.

WILLIAM K. STEVENS, OF ALEXANDRIA, LOUISIANA.

LUBRICATOR.

Specification of Letters Patent No. 19,385, dated February 16, 1858.

*To all whom it may concern:*

Be it known that I, WILLIAM K. STEVENS, of Alexandria, in the parish of Rapides and State of Louisiana, have invented a new and Improved Lubricator for the Valves and Cylinders of Steam-Engines and other Apparatus of Similar Character; and I do hereby declare that the following is a full, clear, and exact description of the same, reference being had to the accompanying drawings, forming part of this specification, in which the figures are vertical sections at right angles to each other of a lubricator with my improvement.

Similar letters of reference indicate corresponding parts in both figures.

A, is an oil chamber consisting of a hollow horizontal cylinder having a passage $a$, in the top communicating with cup B, which is supposed to be kept filled with oil or grease, and a passage $b$, in the bottom to communicate with the valve chest cylinder or other place to be lubricated.

The cylinder A, is bored truly and fitted with a movable head C, which is bored centrally for the valve spindle D, to pass through. The spindle D is provided with a journal $c$, at its inner end to fit into a bearing in the fixed head of the cylinder, said bearing not extending all through the head; and it is also provided with a shoulder $d$, to fit up to the movable head C, so that by the application of set screw $e$, at the end of the journal the said shoulder may be brought up close to the movable head and make a tight working joint which dispenses with packing for the spindle. The spindle D, has secured to it a disk E, which carries the two valves F, F, which are made in the form of segments of cylinders and ground to fit the interior of the cylinder A, and are provided with tongues $f$, $f$, on their back sides to fit in notches $g$, $g$, in the periphery of the disk E. The disk E has a hub in which are secured two pins $h$, $h$, which occupy radial positions and have screw threads cut upon them and are fitted with nuts $i$, $i$, which serve as bearings for two bow shaped springs $j$, $j$, which press against the backs of the valves and hold them out in contact with the interior of the cylinder A, the said pins passing through holes in the springs and thereby serving to hold them in place and the nuts serving to adjust the pressure of the springs. The two valves are so arranged relatively to each other and to the passages $a$, and $b$, that when the spindle D and disk E, are turned to bring one valve in a position to open the passage $a$, it moves the other over the passage $b$, and thus allows the oil to descend by gravitation from the cup B to the chamber A without allowing steam to pass through the chamber, and when it is turned to bring one valve in a position to open the passage $b$, to allow the oil to descend by gravitation from the chamber to the valve chest cylinder or other place to be lubricated it moves the other over the passage $a$, and prevents the steam blowing through the oil cup, or in other words the arrangement is such that either passage may be opened by turning the spindle D, but that both passages are never opened at once.

The spindle is turned by a lever G, attached to it outside the movable head C. The springs keep the valves always tight notwithstanding any wear. The tongues and notches $f$, $g$, attach the valves to the disk but leave them free to adjust themselves to their seats. The motion of the spindle is limited so that it may move only far enough to open either passage by means of a stop pin $k$, screwed into the fixed cylinder head and the faces $l$, $l$, of a notch in the periphery of the disk.

What I claim as new in lubricators and desire to secure by Letters Patent, is—

The arrangement herein shown and described of the disk E, and valves F, when the latter operate and are rendered adjustable substantially as and for the purposes herein set forth.

WILLIAM K. STEVENS.

Witnesses:
JOHN M. CLOSKEY,
MERCER CANFIELD.